(12) United States Patent
Han et al.

(10) Patent No.: US 7,932,688 B2
(45) Date of Patent: Apr. 26, 2011

(54) CLEANER AND METHOD FOR DRIVING THE SAME

(75) Inventors: Seung Do Han, Gyeonggi-do (KR); Hyoun Jeong Shin, Incheon (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 12/129,759

(22) Filed: May 30, 2008

(65) Prior Publication Data

US 2008/0297086 A1 Dec. 4, 2008

(30) Foreign Application Priority Data

Jun. 1, 2007 (KR) ........................ 10-2007-0053848

(51) Int. Cl.
*H02P 4/00* (2006.01)
(52) U.S. Cl. ...... 318/441; 318/701; 318/431; 318/254.1
(58) Field of Classification Search ................. 318/441, 318/701, 431, 254.1
See application file for complete search history.

(56) References Cited

U.S. PATENT DOCUMENTS

| | | | |
|---|---|---|---|
| 4,835,409 A * | 5/1989 | Bhagwat et al. ............... 307/64 |
| 6,313,597 B1 | 11/2001 | Elliott et al. | |
| 6,448,732 B1 * | 9/2002 | Block ........................... 318/635 |
| 6,664,748 B2 * | 12/2003 | Kushida et al. ............... 318/139 |
| 7,076,830 B2 | 7/2006 | Conner et al. | |
| 2004/0135537 A1 | 7/2004 | Conner et al. | |
| 2006/0218742 A1 | 10/2006 | Lim et al. | |
| 2007/0124891 A1 | 6/2007 | Lee et al. | |
| 2007/0130720 A1 | 6/2007 | Kim et al. | |
| 2007/0130722 A1 | 6/2007 | Chung et al. | |
| 2008/0050252 A1 | 2/2008 | Ahn | |

FOREIGN PATENT DOCUMENTS

| | | |
|---|---|---|
| JP | 2006-095337 A | 4/2006 |
| KR | 10-1998-0015028 A | 2/1998 |
| KR | 10-2000-0011429 A | 2/2000 |

OTHER PUBLICATIONS

English language Abstract of KR 10-2000-0011429 A, Feb. 25, 2000.
English language Abstract of JP 2006-095337 A, Apr. 13, 2006.

* cited by examiner

*Primary Examiner* — Walter Benson
*Assistant Examiner* — David S Luo
(74) *Attorney, Agent, or Firm* — McKenna Long & Aldridge LLP

(57) ABSTRACT

A cleaner that can be operated at motive force of sufficient strength by using a battery voltage as well as by using a AC voltage. The cleaner uses a low-resistance-mode motor to rotate a collecting fan. The low-resistance-mode motor is driven by a motor driver. The motor driver drops a DC voltage converted from the AC voltage, depending on whether the AC voltage is received. Depending on whether the AC voltage is received, the motor driver drives the low-resistance-mode motor using one of the battery voltage and the dropped voltage.

17 Claims, 3 Drawing Sheets

CLEANER AND METHOD FOR DRIVING THE SAME

FIELD OF THE INVENTION

The present disclosure relates to a power control system for controlling a voltage supplied to a motor. More particularly, the present disclosure relates to a power control system for controlling a voltage supplied to a motor for use in a vacuum cleaner.

BACKGROUND

The present disclosure relates to a cleaner for collecting pollutant particles such as dust and dirt and a method for driving the cleaner.

A cleaner makes it possible to clean a desired region without scattering pollutant particles such as dust and dirt. The reason for this is that the cleaner collects (or traps) pollutant particles by inhalation or suction. In order to collect pollutant particles, the cleaner has a collecting fan that is rotated by an electric motor.

An AC voltage of about 110 V or 220 V is used to drive the electric motor of the cleaner. Thus, the cleaner is equipped with a power cord for receiving the AC voltage. This power cord, however, restricts a possible cleaning region that can be cleaned using the cleaner.

In order to overcome the restriction of the possible clean region, an AC/DC hybrid cleaner has been proposed that can collect pollutant particles by the DC voltage of a battery as well as by the AC voltage. The AC/DC hybrid cleaner drives an electric motor by the DC battery voltage in a region outside a radius of the length of a power cord, thereby making it possible to collect pollutant particles without the restriction of a possible cleaning region. While the AC/DC hybrid cleaner can obtain a DC voltage of about 310 V from the AC voltage, it can obtain a DC voltage of about 30 V from the battery. Such a difference of 10 times in the DC voltage leads to a difference of 100 times in motive power supplied to the collecting fan.

In order to minimize such a power difference caused by the DC voltage difference, the AC/DC hybrid cleaner has a hybrid universal motor with a dual-coil structure that enables a switch between a low-impedance mode and a high-impedance mode. When a 310 V DC voltage is supplied using the AC voltage, the hybrid universal motor is driven in a high-resistance mode where dual coils are connected in series to each other. On the other hand, when a DC voltage of about 30 V is supplied from the battery, the hybrid universal motor is driven in a low-resistance mode where the dual coils are connected in parallel to each other. An impedance change due to a change in the connection structure of the dual lines reduces the difference between the motive power generated using the AC voltage and the motive power generated using the voltage of the battery.

However, even in this case, the motive power generated using the voltage of the battery is merely 1/10 of the motive power generated using the AC voltage. That is, even by the change of the connection structure of the dual lines, sufficient motive power is difficult to generate using the DC voltage of the battery. Consequently, when the DC voltage of the battery is used to generate the motive power, the AC/DC hybrid cleaner including the hybrid universal motor is very poor in collecting pollutant particles and requires a long cleaning time.

SUMMARY

Embodiments provide a cleaner that can be operated by sufficient motive power using a battery voltage as well as using an AC voltage, and a method for driving the cleaner.

Embodiments also provide a cleaner that can reduce the time taken to clean up pollutant particles using a battery voltage to the time taken to clean up the pollutant particles using an AC voltage, and a method for driving the cleaner.

In one embodiment, a cleaner includes a low impedance motor for rotating a collecting fan; a battery; a voltage converter for converting an AC voltage received from a power source into a DC voltage; and a motor driver for selectively dropping a voltage of the battery and the DC voltage from the voltage converter and driving the low impedance motor with the selective dropped voltage, depending on whether the AC voltage is received.

In another embodiment, a cleaner drives a low impedance motor with a selectively dropped voltage derived from a selectively dropping operation of a voltage of a battery and a DC voltage depending on whether an AC voltage is received from a power source. The DC voltage is converted from the AC voltage.

In further another embodiment, a method for driving a cleaner includes converting an AC voltage received from a power source into a DC voltage; actively switching between the DC voltage and a voltage of a battery; detecting whether the AC voltage is received; and driving a low impedance motor with a selectively dropped voltage derived from a selectively dropping operation of the actively switched voltage according to the detection results.

The details of one or more embodiments are set forth in the accompanying drawings and the description below. Other features will be apparent from the description and drawings, and from the claims.

BRIEF DESCRIPTION OF THE DRAWINGS

The accompanying drawings are intended to provide a further understanding of the present disclosure. In the drawings.

DETAILED DESCRIPTION OF THE EMBODIMENTS

Reference will now be made in detail to the embodiments of the present disclosure, examples of which are illustrated in the accompanying drawings. Wherever possible, the same reference numbers will be used throughout the drawings to refer to the same or like parts.

Figure 1:
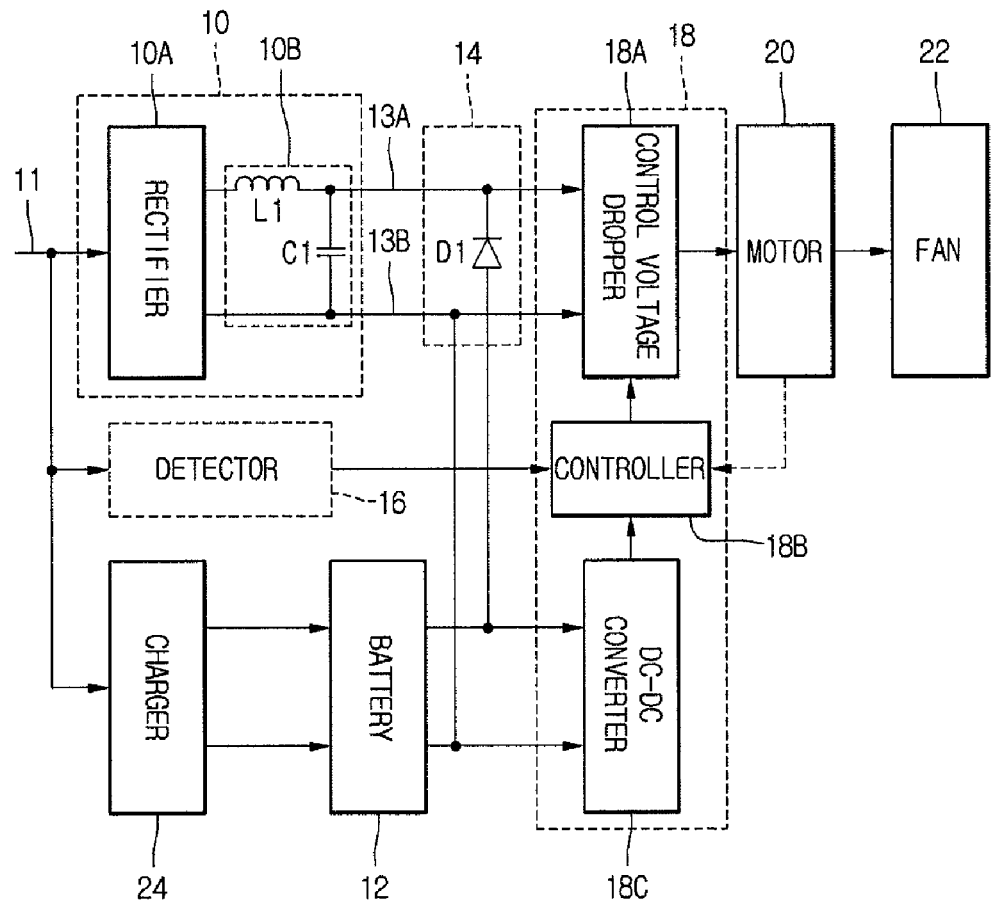
FIG. 1 is a block diagram of a cleaner according to an embodiment.

FIG. 1 is a block diagram of a cleaner according to an embodiment.

Referring to FIG. 1, the cleaner includes a battery 12 and an AC-DC converter 10 for converting an AC voltage into a DC voltage. The AC voltage is received from a conventional source such as, for example, a power utility company, a power generator, or any other entity and/or device capable of generating an AC voltage.

The AC-DC converter 10 converts an AC voltage (e.g., 220 V), which is received from a power cord 11, into a DC voltage. When the AC voltage is provided through the power cord 11, an output DC voltage of the AC-DC converter 10 (hereinafter referred to as "first DC voltage") has a high voltage level of about 310 V. For this voltage conversion, the AC-DC converter 10 includes a smoother 10B and a rectifier 10A connected in series to the power cord 11. The power cord 11 is connected to a voltage source (not illustrated). The rectifier 10A full-wave rectifies or half-wave rectifies the AC voltage received from the power cord 11, thereby outputting a ripple voltage. The smoother 10B smoothes the ripple voltage from the rectifier 10A to generate the first DC voltage. To this end, the smoother 10B includes a choke coil L1 connected between a high-voltage line 13 and a high-voltage output terminal of the rectifier 10A, and a capacitor C1 connected between the high-voltage line 13 and a base-voltage line 15. The choke coil L1 suppresses a ripple component contained in the ripple voltage that will be provided from the high-voltage output terminal of the rectifier 10A to the high-voltage line 13. The capacitor C1 is charged and discharged depending on the suppressed ripple voltage from the choke coil L1 such that the first DC voltage of about 310 V is applied on the high-voltage line 13. That is, the capacitor C1 smoothes the ripple voltage received from the rectifier 10A. The first DC voltage output from the smoother 10B is provided to an active voltage selector 14.

The battery 12 supplies its charged DC voltage to the active voltage selector 14. The charged DC voltage of the battery 12 (hereinafter referred to as "second DC voltage") has a low voltage level of about 50 V. In order to generate the second DC voltage with a low voltage level of about 50 V, the battery 12 includes about 24 to 30 charge cells. Ni-MH charge cells may be used as the charge cells of the battery 12.

The active voltage selector 14 monitors whether the first DC voltage is received from the AC-DC converter 10. Depending on whether the first DC voltage is received, the active voltage selector 14 provides one of the second DC voltage from the battery 12 and the first DC voltage from the AC-DC converter 10 to a control voltage dropper 18A of a motor driver 18. When the first DC voltage is not received from the AC-DC converter 10 (i.e., in a DC voltage mode), the active voltage selector 14 provides the second DC voltage from the battery 12 to the control voltage dropper 18A of the motor driver 18. On the other hand, when the first DC voltage is received from the AC-DC converter 10 (i.e., in an AC voltage mode), the active voltage selector 14 provides the first DC voltage received from the AC-DC converter 10 to the control voltage dropper 18A of the motor driver 18. To this end, the active voltage selector 14 includes a unidirectional element (such as, for example, a diode D1) that is connected between a high-voltage output terminal of the battery 12 and the high-voltage line 13 (specifically, a connection node between the choke coil L1 and a high-voltage input terminal of the control voltage dropper 18A). When a voltage on the high-voltage line 13 is higher than a voltage on the high-voltage output terminal of the battery 12 (i.e., in the AC voltage mode where the first DC voltage is provided to the high-voltage line 13), the diode D1 is turned off to interrupt the second DC voltage to be provided from the battery 12 to the control voltage dropper 18A. At this point, the first DC voltage is provided from the AC-DC converter 10 to the control voltage dropper 18A. On the other hand, when a voltage on the high-voltage line 13 is lower than a voltage on the high-voltage output terminal of the battery 12 (i.e., in the DC voltage mode where the first DC voltage is not provided to the high-voltage line 13), the diode D1 is turned on to provide the second DC voltage from the battery 12 to the control voltage dropper 18A. The active voltage selector 14 may further include an additional diode that is connected between the choke coil L1 and the high-voltage line 13 (specifically, a connection node between the diode D1 and the high-voltage input terminal of the control voltage dropper 18A). The additional diode prevents the second DC voltage from the battery 12 from leaking to the AC-DC converter 10, thereby increasing the available time (i.e., the discharge period) of the battery 12.

The cleaner further includes a detector 16 connected to the power cord 11, and a serial circuit of a motor 20 and a collecting fan 22 connected the motor driver 18. The detector 16 detects whether the AC voltage is supplied through the power cord 11. Depending on the detection results, the detector 16 provides a controller 18B of the motor driver 18 with an AC voltage detection signal having one of a high logic voltage and a low logic voltage (i.e., a base voltage). When the AC voltage is supplied through the power cord 11, the detector 16 provides the controller 18B with an AC voltage detection signal with a high logic voltage for indicating or designating the AC voltage mode. On the other hand, when the AC voltage is not supplied through the power cord 11, the detector 16 provides the controller 18B with an AC voltage detection signal with a low logic voltage for indicating or designating the DC voltage mode. To this end, the detector 16 includes a diode for rectification and resistors for voltage division. In addition, the detector 16 may further include a smoothing capacitor for further stabilizing the AC voltage detection signal.

Alternatively, the detector 16 may detect a voltage on an output terminal of the AC-DC converter 10 to determine whether the AC voltage is supplied. In this case, there may be an error in the determination by the detector 16 or the circuit configuration of the detector 16 may be complex.

Further alternatively, the detector 16 may be implemented using a program operating in the controller 18B. In this case, the controller 18 may be electromagnetically connected to the power cord 11.

Depending on the logic voltage levels of the AC voltage detection signal from the detector 16, the motor driver 18 selectively drops a voltage to be supplied to the motor 20 (i.e., a voltage supplied from the active voltage selector 14 to the motor 20). That is, in order to drive the motor 20, the motor driver 18 drops and uses an actively-selected voltage or uses the actively-selected voltage as it is, depending on the detection results of the detector 16. When the AC voltage detection signal of a high logic voltage is received from the detector 16 (i.e., in the AC voltage mode), the motor driver 18 drops the voltage from the active voltage selector 14 (i.e., the first DC voltage) by a factor of $1/10$ or $1/6$ and drives the motor 20 using the dropped voltage. In this case, an average voltage supplied to the motor 20 is identical to an average voltage (about 28 to 50 V) supplied using the second DC voltage of the battery 12. In order to adjust the rotation speed of the motor 20, the motor driver 18 controls a voltage drop rate to be 80 to 90%. On the other hand, when the AC voltage detection signal of a low logic voltage is received from the detector 16 (i.e., in the DC voltage mode), the motor driver 18 drives the motor 20 using the voltage from the active voltage selector 14 (i.e., the second DC voltage from the battery 12) as it is. In the DC voltage mode, the motor driver 18 may drop the actively-selected voltage (i.e., the second DC voltage from the battery 12) by a voltage drop rate of within 50% in order to adjust the rotation speed of the motor 20. In order to adjust the rotation speed (i.e., the rotational force) of the motor 20, the motor driver 18 may respond to key switches for output selection (not illustrated).

In order to selectively drop the actively-selected voltage depending on whether the AC voltage is received, the motor driver 18 includes the controller 18B for controlling the voltage drop rate of the control voltage dropper 18A. Under the control of the controller 18B, the control voltage dropper 18A drops the selected DC voltage (i.e., the first or second DC voltage) from the active voltage selector 14 and drives the motor 20 using the dropped voltage. In the DC voltage mode, the control voltage dropper 18A drops the actively-selected voltage (i.e., the second DC voltage from the battery 12) by a voltage drop rate of within 50% and supplies the motor 20 with the dropped voltage as a motor driving signal. In the AC voltage mode, the control voltage dropper 18A drops the actively-selected voltage (i.e., the first DC voltage from the AC-DC converter 10) by a voltage drop rate of about 80% to 90% and supplies the motor 20 with the dropped voltage as a motor driving signal. In this manner, the actively-selected voltage is dropped by one of a voltage drop rate of within 50% and a voltage rate of 80% to 90% depending on whether the current mode is the DC voltage mode or the AC voltage mode. Accordingly, independently of the voltage mode used, the control voltage dropper 18A causes the motor 20 to rotate at the speed set by the user (or to generate the rotational force set by the user).

In response to the AC voltage detection signal from the detector 16, the controller 18B selects one of a mode corresponding to the voltage drop rate of within 50% and a mode corresponding to the voltage rate of 80% to 90%. In addition, in the selected voltage drop rate mode, the controller 18B determines a voltage drop rate corresponding to the rotation speed (the rotational force) set by the user. Furthermore, the controller 18B provides the control voltage dropper 18A with a pulse width modulation (PWM) signal, which has a duty rate corresponding to the determined voltage drop rate, as a voltage drop control signal. In response to the voltage drop control signal from the controller 18B, the control voltage dropper 18A periodically controls the actively-selected voltage (i.e., the first or second DC voltage) to adjust the voltage to be supplied to the motor 20. For example, a central processing unit (CPU) or a microcomputer may be used as the controller 18B.

The motor driver 18 further includes a DC-DC converter 18C that is connected between the battery 12 and the controller 18B. The DC-DC converter 18C down-converts (level-shifts) the second DC voltage of the battery 12 to a transistor logic voltage (e.g., the first DC voltage of about 5 V). The transistor logic voltage generated by the DC-DC converter 18C is provided to the controller 18B so that the controller 18B can operate stably. In order to generate the transistor logic voltage stably using the second DC voltage, the DC-DC converter 18C includes a switched-mode power supply (SMPS). Alternatively, the DC-DC converter 18C may include a resistor-based voltage divider.

The motor 20 is driven by a motor driving signal from the control voltage dropper 18A of the motor driver 18 to generate rotational force (i.e., rotational torque) that will be transmitted to the collecting fan 22. A hybrid universal motor set to a low-impedance mode is used as the motor 20. When the voltage of the battery 12 (i.e., the second DC voltage of 50V) is used, the hybrid universal motor 20 of low-impedance mode has a rotor coil and commutator coils of characteristic impedance that is low enough to provide a desired rotation speed (e.g., about 7000 to 9000 rpm) or to generate a desired rotational force. In addition, the hybrid universal motor 20 of low-impedance mode is rotated at a desired rotation speed of about 7000 to 9000 rpm even by the first DC voltage dropped by 10% to 20% in the AC voltage mode.

The collecting fan 22 is rotated by the rotational force (or rotational torque) of the motor 20 to generate inhalation force. This inhalation force causes pollutant particles (e.g., dust and dirt) to be collected into the collecting space (not illustrated) of the cleaner. The rotational force with a desired strength is supplied from the hybrid universal motor 20 having the rotator coil and the commutator coils of low characteristic impedance by using the voltage of the battery 12 as well as by using the AC voltage. Accordingly, the collecting fan 22 can generate the inhalation force with a desired strength by using the voltage of the battery 12 as well as by using the AC voltage, thereby making it possible to reduce the time taken to clean up pollutant particles using the voltage of the battery 12 to about the time taken to clean up the pollutant particles using the AC voltage.

The cleaner further includes a charger 24 that is connected between the power cord 11 and the battery 12. In the AC voltage mode where the AC voltage is supplied through the power cord 11, the charger 24 performs a rectifying/smoothing operation to convert the AC voltage into the second DC voltage. In addition, the charger 16 supplies the second DC voltage to the battery 12 such that the battery 12 is charged with the second DC voltage.

Figure 2:
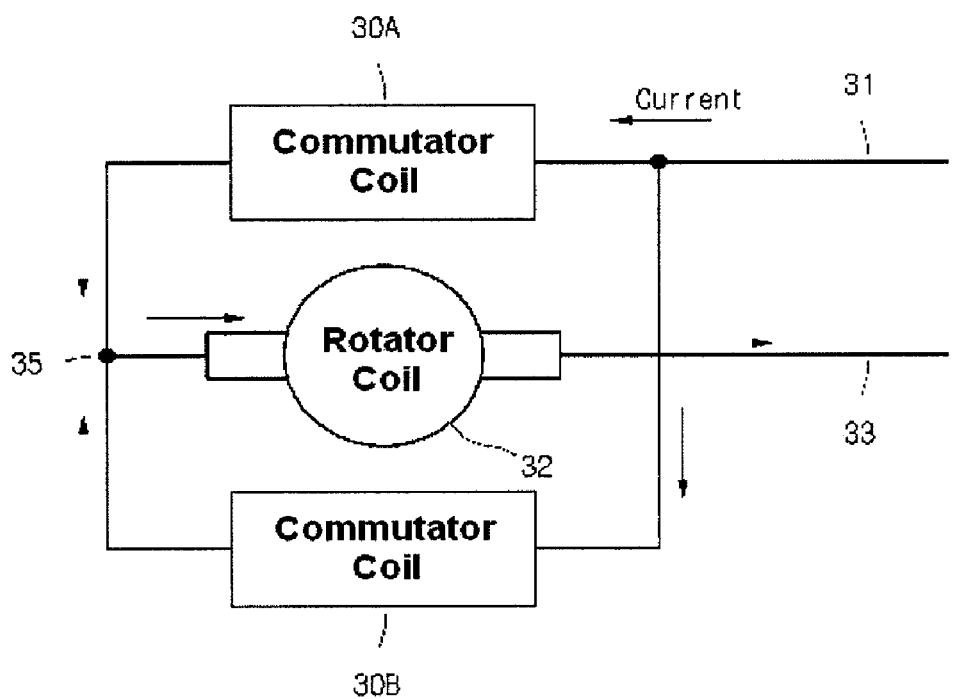
FIG. 2 is an equivalent circuit diagram illustrating a coil connection structure of a motor illustrated in FIG. 1.

FIG. 2 is an equivalent circuit diagram illustrating the hybrid universal motor 20 illustrated in FIG. 1.

Referring to FIGS. 1 and 2, the hybrid universal motor 20 includes first and second commutator coils 30A and 30B connected in common to a high-voltage terminal 31 and a rotator coil 32 connected to a low-voltage terminal 33. The first and second commutator coils 30A and 30B and the rotator coil 32 are connected in common to a connection node 35. That is, the hybrid universal motor 20 has the commutator coils 30A and 30B and the rotator coil 32 that form a serial/parallel coil circuit. The serial/parallel coil circuit includes a parallel circuit of the commutator coils 30A and 30B connected between the high-voltage terminal 31 and the connection node 35, and the rotator coil 32 that forms a serial circuit in conjunction with the parallel circuit of the commutator coils 30A and 30B. The first and second commutator coils 30A and 30B and the rotator coil 32 are wound at a low winding number. The rotator coil 32 is lower in the winding number than the commutator coils 30A and 30B. The serial/parallel coil circuit, the commutator coils 30A and 30B, and the rotator coil 32 cause the hybrid universal motor 20 to have low characteristic impedance so that the motor can be driven at the desired rotation speed (about 7000 to 9000 rpm) by the voltage (about 28 to 50 V) of the battery 12. Because the first DC voltage of about 310 V converted from the AC voltage in the AC voltage mode is reduced by $1/10$ to $1/6$, the hybrid universal motor 20 of low characteristic impedance can be driven at the desired rotation speed by the voltage of the battery 12 as well as by the AC voltage, thereby supplying the desired rotation force to the collecting fan 22. When the motor driving signal is supplied from the control voltage dropper 18A to the high-voltage terminal 31 of the hybrid universal motor 20, a corresponding current is divided into two currents via the first and second commutator coils 30A and 30B, the two currents are recombined on the connection node 35. The recombined current returns to the control voltage dropper 18A via the rotator coil 32 and the low-voltage terminal 33.

Figure 3:
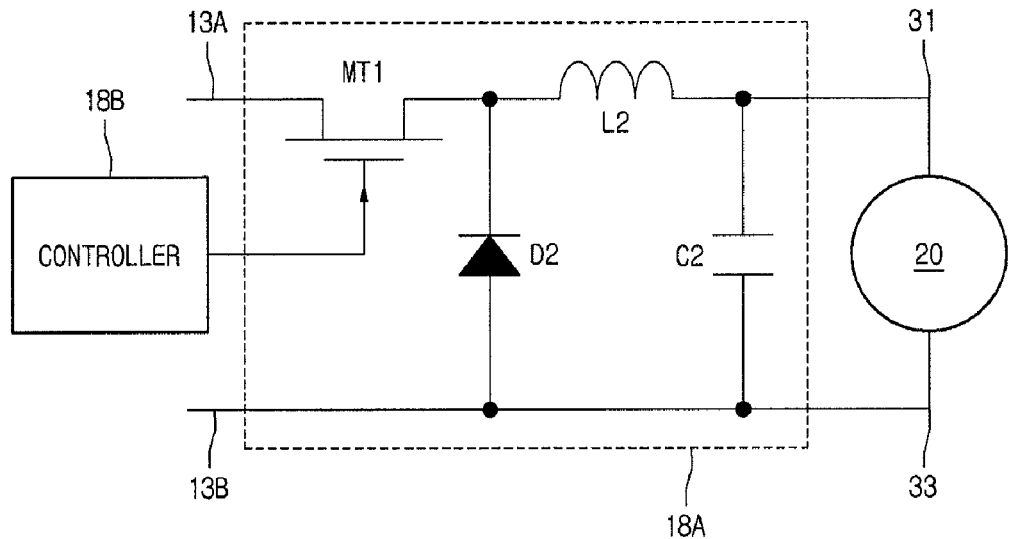
FIG. 3 is a circuit diagram of an embodiment of a control voltage dropper illustrated in FIG. 1.

FIG. 3 is a circuit diagram of an embodiment of the control voltage dropper 18A illustrated in FIG. 1.

Figure 4:
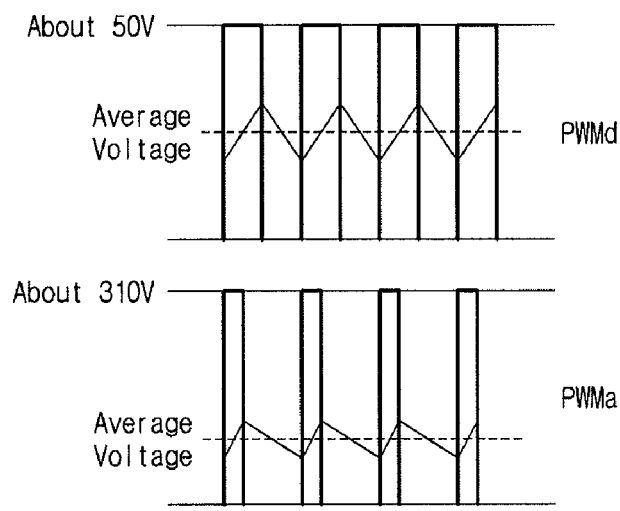
FIG. 4 is a waveform diagram of a driving signal for the motor and an output signal in FIG. 3.
Figure 4:
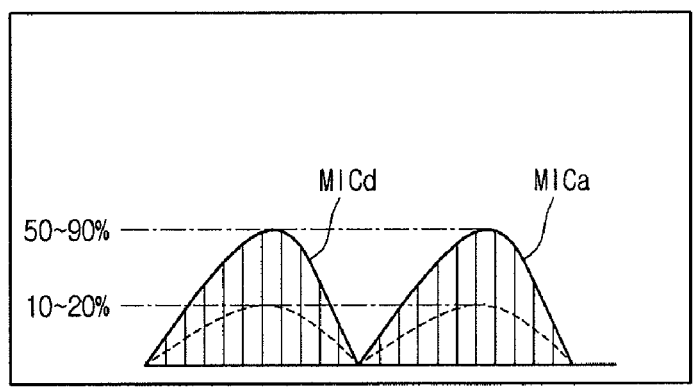

Referring to FIGS. 1 and 3, the control voltage dropper 18A includes a choke coil L2 and a field-effect transistor MT1 connected in series between the high-voltage line 13A and the high-voltage terminal 31 of the hybrid universal motor 20, and a capacitor C2 connected between the base-voltage line 13B (i.e., or the low-voltage terminal 33 of the hybrid universal motor 20) and a connection node between the choke coil L2 and the high-voltage terminal 31. The base-voltage line 13B is connected to the low-voltage terminal 33 of the hybrid universal motor 20. In response to the PWM signal from the controller 18B, the field-effect transistor MT1 periodically interrupts the actively-selected voltage (i.e., the first or second DC voltage) to be provided from the high-voltage line 13A of the active voltage selector 14 to the choke coil L2, such that a voltage of about 28 to 50 V is provided to the high-voltage terminal 31 of the hybrid universal motor 20. In the DC voltage mode, the field-effect transistor MT1 is turned on in a period of 50% or more at regular intervals as denoted by PWMd of FIG. 4. Accordingly, as denoted by MICd of FIG. 4, a voltage corresponding to 50% to 90% of the actively-selected voltage (i.e., the voltage of the battery 12) is provided through the choke coil L2 to the high-voltage terminal 31 of the hybrid universal motor 20. In the AC voltage mode, the field-effect transistor MT1 is turned on in a period of about 10% to 50% at regular intervals as denoted by PWMa of FIG. 4. In this case, as denoted by MICa of FIG. 4, a voltage corresponding to about 10% to 20% of the actively-selected voltage (i.e., the voltage of about 310 V from the AC-DC converter 10) is provided through the choke coil L2 to the high-voltage terminal 31 of the hybrid universal motor 20. In this manner, depending on whether the current mode is the DC voltage mode or the AC voltage mode, the turn-on period of the field-effect transistor MT1 changes into 50~90% or 10~20%. Accordingly, the hybrid universal motor 20 can be rotated at desired rotation speed of about 7000 to 9000 rpm (i.e., can generate the desired rotational force or torque) by using the voltage of the battery 12 as well as by using the AC voltage.

The choke coil L2 suppresses a ripple component of a PWM voltage to be provided from the field-effect transistor MT1 to the high-voltage terminal 31 of the hybrid universal motor 20. The capacitor C2 smoothes a PWM voltage to be provided from the choke coil L2 to the high-voltage terminal 31 of the hybrid universal motor 20. By the choke coil L2 and the capacitor C2, PWM voltages PWMd and PWMa are changed into ripple forms as denoted by MICd and MICa of FIG. 4.

The control voltage dropper 18A of FIG. 3 further includes a diode D2 that is connected between the base-voltage line 13B and the connection node between the field-effect transistor MT1 and the choke coil L2. The diode D2 is installed against a current direction to prevent the hybrid universal motor 20 from being damaged by counter electromotive force.

Figure 5:
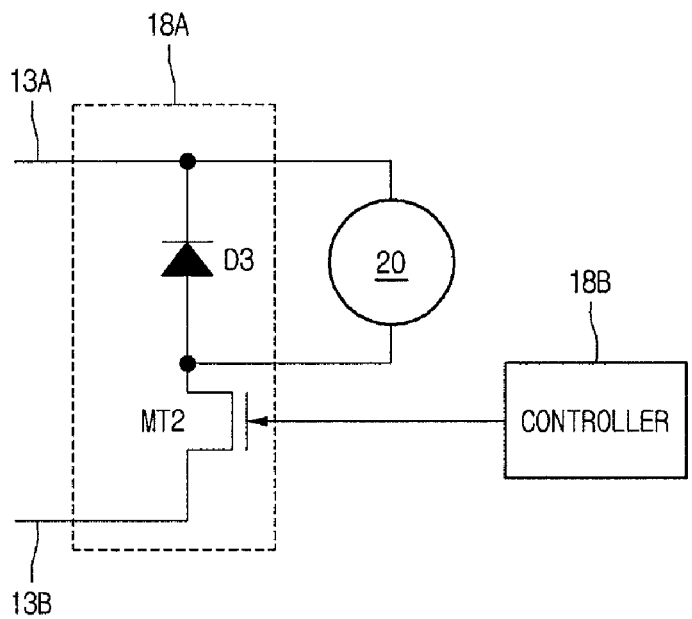
FIG. 5 is a circuit diagram of another embodiment of the control voltage dropper illustrated in FIG. 1.

FIG. 5 is a circuit diagram of another embodiment of the control voltage dropper 18A illustrated in FIG. 1.

Referring to FIGS. 1 and 5, the control voltage dropper 18A includes a field-effect transistor MT2 connected in series to the hybrid universal motor 20 between the high-voltage line 13A and the base-voltage line 13B, and a diode D3 connected in parallel to the hybrid universal motor 20.

In response to the PWM signal from the controller 18B, the field-effect transistor MT2 periodically interrupts the actively-selected voltage (i.e., the first or second DC voltage) to be provided from the high-voltage line 13A of the active voltage selector 14 to the choke coil L2, such that a voltage of about 28 to 50 V is provided to the high-voltage terminal 31 of the hybrid universal motor 20. In the DC voltage mode, the field-effect transistor MT2 is turned on in a period of 50% or more at regular intervals as denoted by PWMd of FIG. 4. That is, the field-effect transistor MT2 establishes a current path of the hybrid universal motor 20 in a period of 50% to 90% at regular intervals. Accordingly, a voltage corresponding to 50% to 90% of the actively-selected voltage (i.e., the voltage of the battery 12) is provided to the hybrid universal motor 20. In the AC voltage mode, the field-effect transistor MT2 is turned on in a period of about 10% to 50% at regular intervals as denoted by PWMa of FIG. 4. That is, the field-effect transistor MT2 establishes a current path of the hybrid universal motor 20 in a period of 10% to 20% at regular intervals. In this case, an average voltage corresponding to about 10% to 20% of the actively-selected voltage (i.e., the voltage of about 310 V from the AC-DC converter 10) is provided to the hybrid universal motor 20. In this manner, depending on whether the current mode is the DC voltage mode or the AC voltage mode, the turn-on period of the field-effect transistor MT2 changes into 50~90% or 10~20%. Accordingly, the hybrid universal motor 20 can be rotated at desired rotation speed of about 7000 to 9000 rpm (i.e., can generate the desired rotational force or torque) by using the voltage of the battery 12 as well as by using the AC voltage.

The diode D3 is installed against a current direction in the hybrid universal motor 20 to prevent the hybrid universal motor 20 from being damaged by counter electromotive force.

Figure 6:
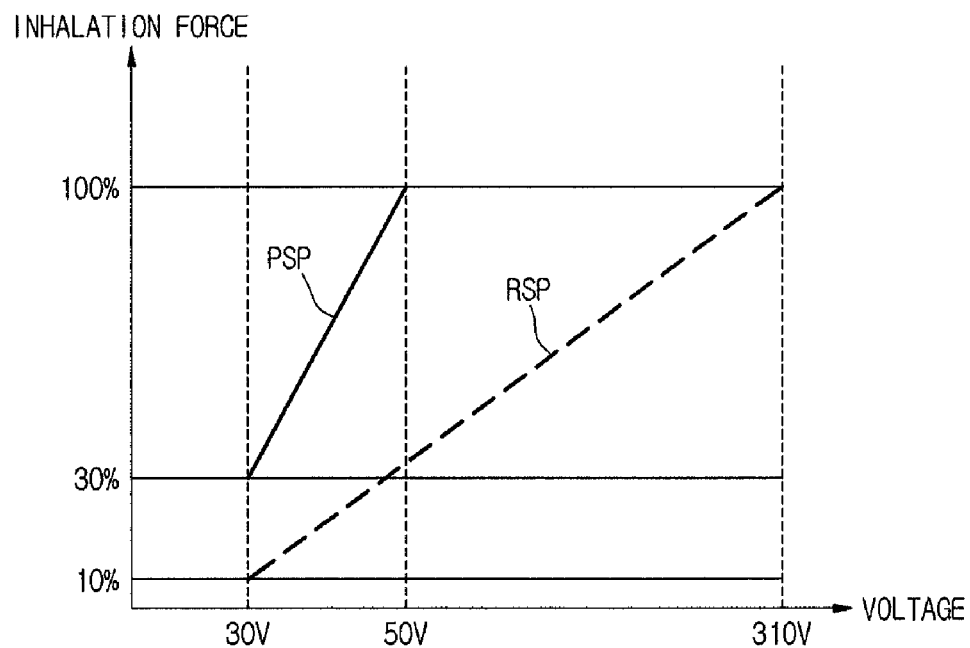
FIG. 6 is a characteristic graph showing the inhalation force of the cleaner according to the present disclosure and the inhalation force of a related art cleaner.

FIG. 6 is a characteristic graph showing the inhalation force of the cleaner according to the present disclosure and the inhalation force of a related art cleaner.

Referring to FIG. 6, the related art cleaner has an inhalation force response RSP from 10% to 100% as a voltage from a motor changes from 30 V to 310 V. Meanwhile, the cleaner according to the present disclosure has an inhalation force response RSP from 30% to 100% as a voltage from a motor changes from 30 V to 50 V. That is, the cleaner according to the present disclosure can generate sufficient inhalation force by the battery voltage of 50 V. Accordingly, the cleaner according to the present disclosure can generate the desired inhalation force by using the battery voltage as well as by using the AC voltage. Consequently, the cleaner according to the present disclosure can reduce the time taken to clean up pollutant particles using the voltage of the battery to about the time taken to clean up the pollutant particles using the AC voltage.

As described above, the cleaner according to the present disclosure uses the hybrid universal motor that has the sufficiently-low characteristic impedance to generate the desired rotational force by the voltage of the battery. Also, in the AC voltage mode where the AC voltage is supplied, the cleaner according to the present disclosure drops the DC voltage of about 310 V to about 28 to 50 V (i.e., the voltage of the battery) and supplies the resulting voltage to the hybrid universal motor. Accordingly, the hybrid universal motor can generate the desired rotational force by the voltage of the battery as well as by the AC voltage. Likewise, the collecting fan can generate the inhalation force with the desired strength by using the voltage of the battery as well as by using the AC voltage. Consequently, the cleaner according to the present disclosure can sufficiently collecting pollutant particles by the voltage of the battery as well as by the AC voltage, and can reduce the time taken to clean up pollutant particles using the voltage of the battery to about the time taken to clean up the pollutant particles using the AC voltage.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The present disclosure relates to subject matter contained in Korean Patent Application No. 10-2007-0053848, filed Jun. 1, 2007, the disclosure of which is expressly incorporated herein by reference, in its entirety.

What is claimed is:

1. A cleaner comprising:
a motor configured to rotate a collecting fan;
a battery configured to generate a first DC voltage;
a voltage converter configured to convert an AC voltage received from a power source into a second DC voltage; and
a motor driver configured to selectively drop the first DC voltage or the second DC voltage to a selectively dropped voltage, the motor driver being further configured to drive the motor with the selective dropped voltage, based on the status of the AC voltage,
wherein the motor driver is further configured to drop the second DC voltage and to drive the motor with the dropped voltage when the status of the AC voltage indicates that the AC voltage is received, and to drive the motor with the first DC voltage when the status of the AC voltage indicates that the AC voltage is not received.

2. The cleaner according to claim 1, wherein the motor comprises a commutator coil having a characteristic impedance adapted for generating a predetermined rotational force or a predetermined driving torque using the first DC voltage.

3. The cleaner according to claim 1, further comprising:
a voltage selector configured to select one of the first DC voltage and the second DC voltage.

4. The cleaner according to claim 3, wherein the voltage selector comprises a unidirectional element configured to selectively interrupt the first DC voltage, which is to be supplied to the motor driver, based on whether the second DC voltage is being supplied to the motor driver.

5. The cleaner according to claim 1, further comprising:
a charger circuit configured to charge the battery using the AC voltage from the power source.

6. The cleaner according to claim 1, further comprising:
a detector configured to detect whether the status of the AC voltage by determining whether the AC voltage is received on the basis of one of the AC voltage from the power source and the second DC voltage, the detector being further configured to provide a detection result to the motor driver.

7. The cleaner according to claim 6, wherein the detector is further configured to be implemented using an operating program of the motor driver.

8. The cleaner according to claim 1, wherein the motor driver comprises:
a controlled voltage dropper configured to drop the first DC voltage or the second DC voltage to be applied to the motor; and
a controller configured to control the controlled voltage dropper to selectively perform a voltage-dropping operation, based on the status of the AC voltage.

9. The cleaner according to claim 8, further comprising:
a DC-DC converter configured to down-convert the first DC voltage to a resulting voltage and to provide the resulting voltage to the controller.

10. A method for driving a cleaner, comprising:
converting an AC voltage received from a power source into a first DC voltage;
switching between the first DC voltage and a second DC voltage received from a battery to provide a switched voltage;
detecting a status of the AC voltage; and
driving a motor with a selectively dropped voltage derived from a selective dropping operation of the switched voltage according to the detection result,
wherein the driving the motor comprises:
dropping the switched voltage to a dropped voltage and driving the motor with the dropped voltage based on the detected status of the AC voltage; and
driving the motor with the switched voltage when the detected status of the AC voltage indicates that the AC voltage is not received.

11. The method according to claim 10, wherein the motor comprises a commutator coil having a characteristic impedance adapted for generating a predetermined rotational force or a predetermined driving torque using the first DC voltage.

12. The method according to claim 10, wherein the driving the motor comprises pulse-width-modulating the switched voltage based on the detection result to provide a pulse-width-modulated voltage.

13. The method according to claim 12, wherein the driving the motor further comprises smoothing the pulse-width-modulated voltage.

14. The method according to claim 10, wherein the switching between the first DC voltage and the second DC voltage comprises:
monitoring the second DC voltage; and
interrupting the first DC voltage based on the monitoring result.

15. The method according to claim 10, wherein the detecting the status of the AC voltage comprises monitoring one of the AC voltage and the first DC voltage.

16. The method according to claim 10, wherein the detecting the status of the AC voltage comprises detecting whether the AC voltage is received by monitoring a state of the AC voltage from the power source.

17. The method according to claim 10, further comprising charging the battery using the AC voltage.

* * * * *